US009487163B2

(12) United States Patent
Matano et al.

(10) Patent No.: US 9,487,163 B2
(45) Date of Patent: Nov. 8, 2016

(54) CHARGING/DISCHARGING HARNESS ROUTING STRUCTURE IN ELECTRIC VEHICLE

(75) Inventors: Shinichi Matano, Atsugi (JP); Tatsuya Shindou, Atsugi (JP); Takuma Kobayashi, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 547 days.

(21) Appl. No.: 14/117,430

(22) PCT Filed: Mar. 1, 2012

(86) PCT No.: PCT/JP2012/055202
§ 371 (c)(1),
(2), (4) Date: Nov. 13, 2013

(87) PCT Pub. No.: WO2012/157316
PCT Pub. Date: Nov. 22, 2012

(65) Prior Publication Data
US 2014/0333130 A1  Nov. 13, 2014

(30) Foreign Application Priority Data

May 17, 2011 (JP) ................................. 2011-110196

(51) Int. Cl.
*B60R 16/02* (2006.01)
*B60L 11/18* (2006.01)
*B60K 1/00* (2006.01)
*B60K 1/04* (2006.01)

(52) U.S. Cl.
CPC ............. *B60R 16/0215* (2013.01); *B60K 1/00* (2013.01); *B60K 1/04* (2013.01); *B60L 11/18* (2013.01);
(Continued)

(58) Field of Classification Search
CPC .. B60K 1/00; B60K 1/04; B60K 2001/0438; B60L 11/18; B60L 11/1877; B60L 2230/12; B60R 16/0207; B60R 16/0215; B60Y 2306/01; B60Y 2400/61; Y02T 10/7005; Y02T 10/705; Y02T 10/7088; Y02T 90/12; Y02T 90/121
See application file for complete search history.

(56) References Cited

U.S. PATENT DOCUMENTS

| 2008/0060860 A1* | 3/2008 | Murase | B60K 1/04 180/65.31 |
| 2010/0307848 A1* | 12/2010 | Hashimoto | B60K 1/04 180/68.5 |

(Continued)

FOREIGN PATENT DOCUMENTS

| EP | 2 196 430 A1 | 6/2010 |
| EP | 2 267 821 A2 | 12/2010 |

(Continued)

OTHER PUBLICATIONS

Japanese Office Action, Mar. 24, 2015, 4 pages.
(Continued)

*Primary Examiner* — Rexford Barnie
*Assistant Examiner* — Elim Ortiz
(74) *Attorney, Agent, or Firm* — Foley & Lardner LLP

(57) ABSTRACT

In an electric vehicle, high-power unit (20) disposed in motor room (2) to supply drive current to motor drive unit (10), and battery pack (30) disposed below vehicle body floor (3) are connected to each other through charging/discharging harness (51). High-power unit 20 includes unit back surface (high-power module back surface) (24) that faces dash panel (4), and harness connection concave portion (25) recessed from unit back surface (24) toward an inside of high-power unit (20), wherein charging/discharging harness connection terminal (26) to which one end (51*a*) of charging/discharging harness (51) is connected is disposed inside of harness connection concave portion (25).

8 Claims, 8 Drawing Sheets

(52) U.S. Cl.
CPC .... *B60L 11/1877* (2013.01); *B60K 2001/0438* (2013.01); *B60L 2230/12* (2013.01); *B60R 16/0207* (2013.01); *B60Y 2306/01* (2013.01); *B60Y 2400/61* (2013.01); *Y02T 10/7005* (2013.01); *Y02T 10/705* (2013.01); *Y02T 10/7088* (2013.01); *Y02T 90/12* (2013.01); *Y02T 90/121* (2013.01)

(56) References Cited

U.S. PATENT DOCUMENTS

| 2012/0031689 | A1 | 2/2012 | Kanno |
| 2012/0031690 | A1 | 2/2012 | Kanno |
| 2012/0038319 | A1 | 2/2012 | Sekido et al. |
| 2012/0055721 | A1 | 3/2012 | Matano |

FOREIGN PATENT DOCUMENTS

| JP | 2006-280037 A | 10/2006 |
| JP | 2009-038920 A | 2/2009 |
| JP | 2011-020622 A | 2/2011 |
| JP | 2011-020625 A | 2/2011 |
| JP | 2011-062053 A | 3/2011 |

OTHER PUBLICATIONS

Russian Decision on Grant, Mar. 13, 2015, 12 pages.

\* cited by examiner

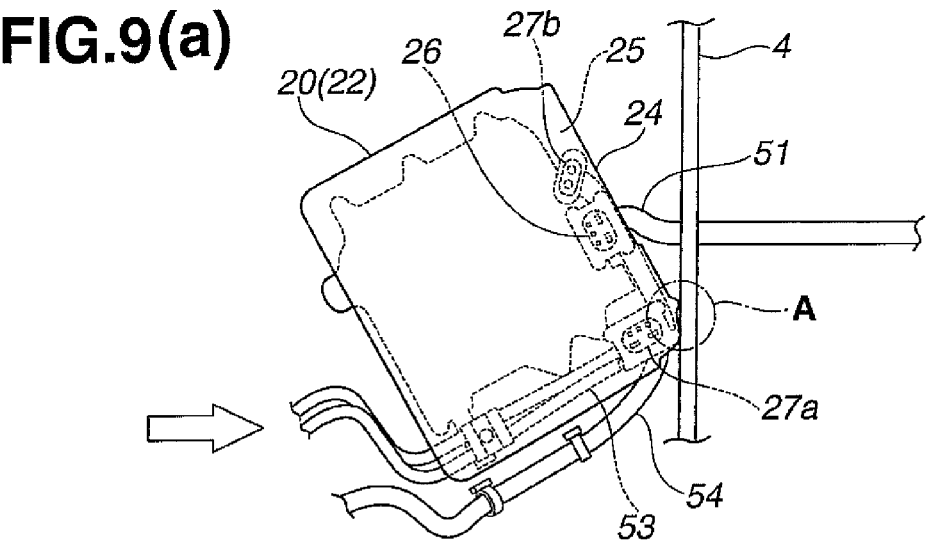
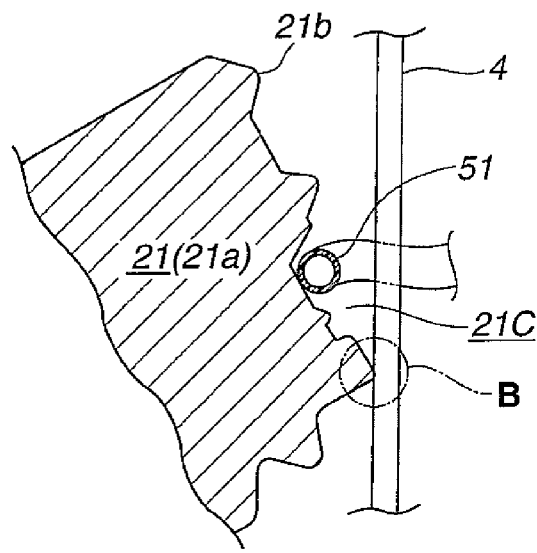
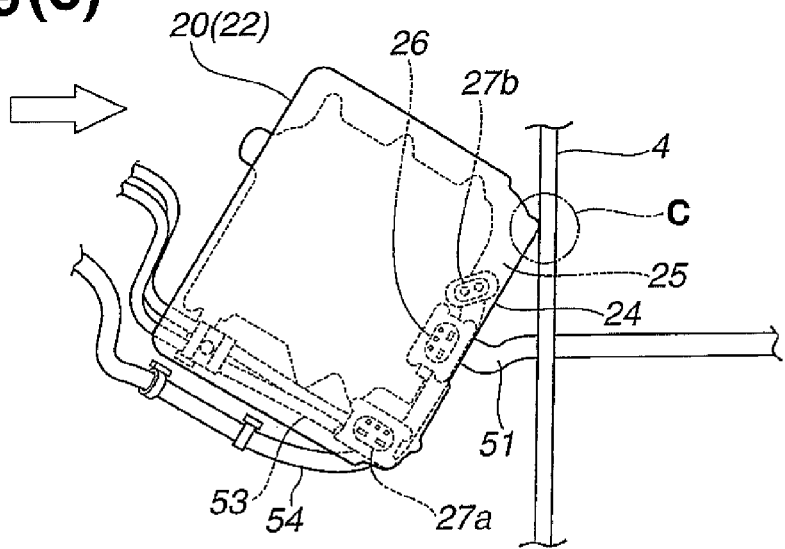

CHARGING/DISCHARGING HARNESS ROUTING STRUCTURE IN ELECTRIC VEHICLE

TECHNICAL FIELD

The present invention relates to an electric vehicle in which a high-power unit disposed within a motor room of the vehicle and a battery pack disposed below a vehicle body floor are connected with each other through a charging/discharging harness, and particularly relates to a structure of a charging/discharging harness routing.

BACKGROUND ART

An electric vehicle in which a motor drive unit as a running drive source and a high-power unit for controlling voltage to be supplied to the motor drive unit are disposed within a motor room, and a battery pack is disposed below a vehicle body floor located on a rear side of the motor room in a forward-rearward direction of the electric vehicle, is conventionally known. In the electric vehicle, the high-power unit and the battery pack are connected with each other through a charging/discharging harness (see, for instance, Patent Literature 1).

However, in the conventional charging/discharging harness routing structure in the electric vehicle, one end of the charging/discharging harness is connected to a lower portion of a back surface of the high-power unit, and the other end thereof is connected to a central part of a front end portion of the battery pack.

Therefore, if the high-power unit is rearward moved upon collision of a front portion of the vehicle or the like, there may occur interference between the one end of the charging/discharging harness connected to the high-power unit and a dash panel upright extending between the motor room and the vehicle body floor. Thus, such a problem that the conventional charging/discharging harness routing structure is inferior in protection of the harness has been developed.

CITATION LIST

Patent Literature

Patent Literature 1: Japanese Patent Application Unexamined Publication No. 2011-020622 A

SUMMARY OF INVENTION

It is an object of the present invention to provide a charging/discharging harness routing structure in an electric vehicle which can protect a charging/discharging harness when an external force is inputted to the electric vehicle.

Solution to Problem

According to the present invention, there is provided a charging/discharging harness routing structure in an electric vehicle which includes a high-power unit disposed within a motor room, a battery pack disposed below a vehicle body floor, and a charging/discharging harness through which the high-power unit and the battery pack are connected with each other. In the charging/discharging harness routing structure in an electric vehicle, the high-power unit includes a unit back surface and a harness connection concave portion.

The unit back surface faces a dash panel upright extending between the motor room and the vehicle body floor.

The harness connection concave portion is recessed from the unit back surface toward an interior of the high-power unit, and a charging/discharging harness connection terminal to which one end of the charging/discharging harness is connected is disposed inside of the harness connection concave portion.

Specifically, the charging/discharging harness connection terminal to which one end of the charging/discharging harness is connected is located to retreat to the inside of the high-power unit with respect to the unit back surface.

With this construction, in a case where the high-power unit is displaced toward a side of the dash panel due to input of an external force to the electric vehicle, initially the unit back surface is brought into contact with the dash panel, and the charging/discharging harness connection terminal within the harness connection concave portion recessed from the unit back surface is free from contact with the dash panel.

As a result, the charging/discharging harness connection terminal can be protected by the unit back surface in the vicinity of the charging/discharging harness connection terminal, thereby enhancing protection of the charging/discharging harness when an external force is inputted to the electric vehicle.

BRIEF DESCRIPTION OF DRAWINGS

FIGS. 8(a) to 8(c) are explanatory diagrams schematically showing a state of the charging/discharging harness upon occurrence of front side collision of the electric vehicle to which the high-power unit according to the embodiment of the present invention is applied, in which FIG. 8(a) is a plan view of the charging/discharging harness, FIG. 8(b) is a side view of an essential part of the charging/discharging harness, and FIG. 8(c) is a sectional view of the charging/discharging harness in the harness retreat concave portion.

FIGS. 9(a) to 9(c) are explanatory diagrams schematically showing a state of the charging/discharging harness upon occurrence of offset collision of the electric vehicle to which the high-power unit according to the embodiment of the present invention is applied, in which FIG. 9(a) is a plan view of charging/discharging harness, FIG. 9(b) is a sectional view of the charging/discharging harness in the harness retreat concave portion, and FIG. 9(c) is a plan view of the charging/discharging harness after the offset collision on the front-right side of the electric vehicle.

DESCRIPTION OF EMBODIMENT

In the following, a charging/discharging harness routing structure in an electric vehicle according to an embodiment of the present invention is explained by referring to the accompanying drawings.

Firstly, the charging/discharging harness routing structure in an electric vehicle according to the embodiment of the present invention is explained hereinafter with respect to "basic construction of electric vehicle", "constitution of unit back surface of high-power unit" and "harness routing structure".

[Basic Construction of Electric Vehicle]

Figure 1:
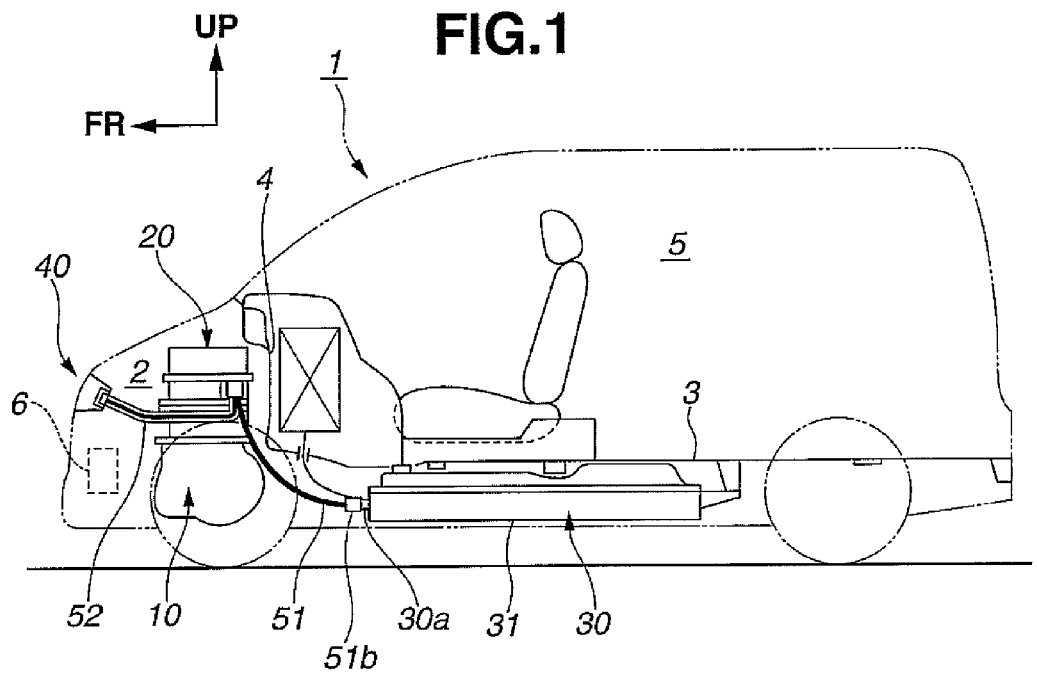
FIG. 1 is a side view showing a main construction of the whole of an electric vehicle to which a charging/discharging harness routing structure according to an embodiment of the present invention is applied.
Figure 2:
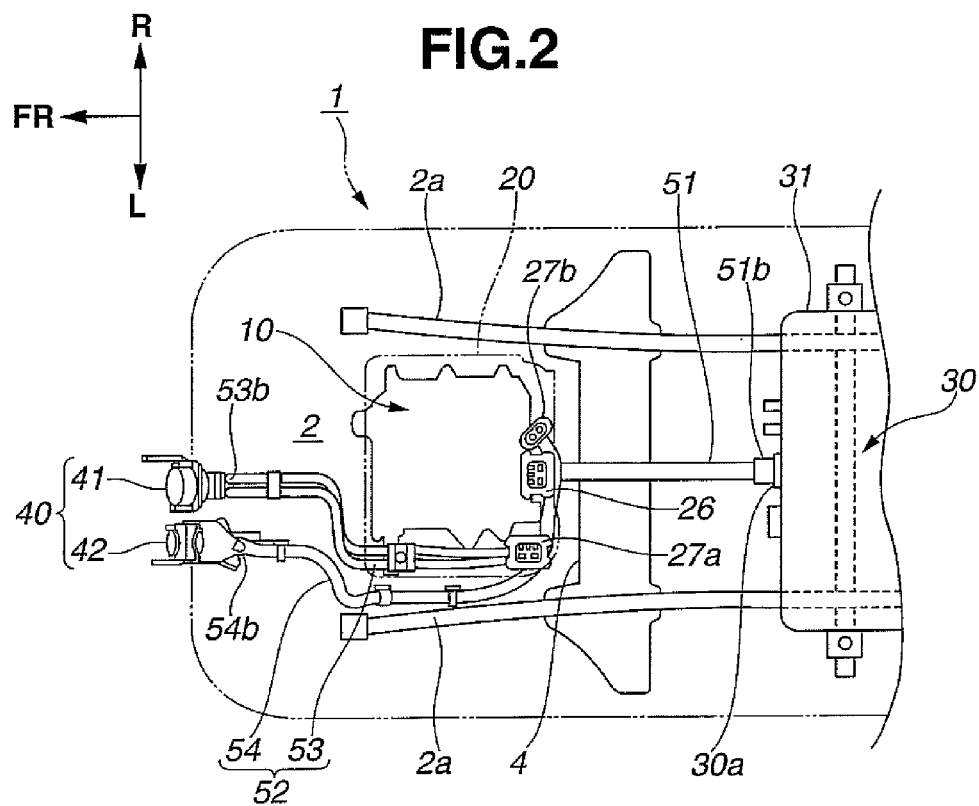
FIG. 2 is a schematic plan view showing a main construction of a front portion of the electric vehicle to which the charging/discharging harness routing structure according to the embodiment of the present invention is applied.
Figure 3:
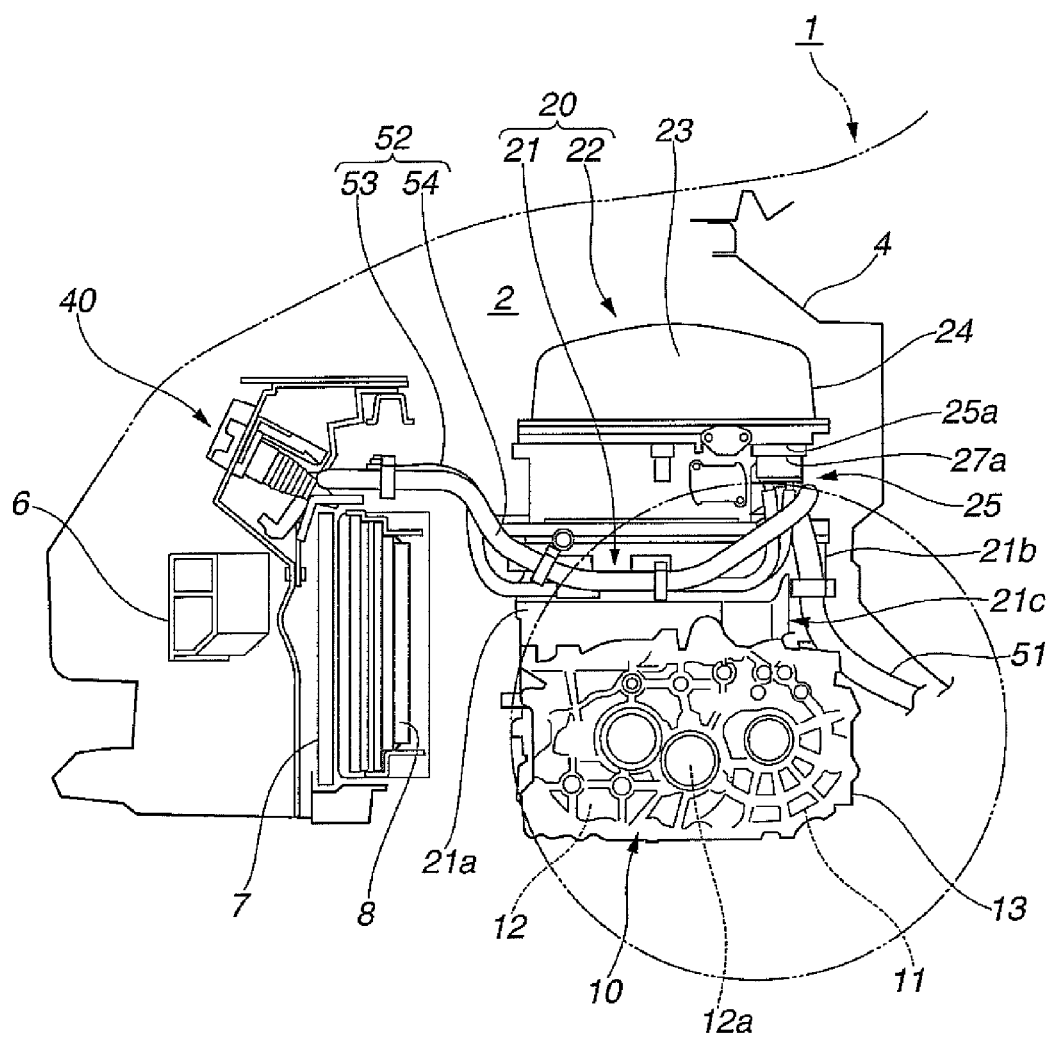
FIG. 3 is a schematic side view showing the main construction of the front portion of the electric vehicle to which the charging/discharging harness routing structure according to the embodiment of the present invention is applied.

FIG. 1 is a side view showing a main construction of the whole of an electric vehicle to which a charging/discharging harness routing structure according to the embodiment of the present invention is applied. FIG. 2 is a schematic plan view showing a main construction of a front portion of the electric vehicle to which the charging/discharging harness routing structure according to the embodiment of the present invention is applied. FIG. 3 is a schematic side view showing the main construction of the front portion of the electric vehicle to which the charging/discharging harness routing structure according to the embodiment of the present invention is applied.

As shown in FIG. 1 and FIG. 2, electric vehicle 1 of the embodiment includes motor drive unit 10, high-power unit 20, battery pack 30 and charging port 40.

Motor drive unit 10 and high-power unit 20 are disposed in motor room 2 formed in a front portion of a vehicle body. On the other hand, battery pack 30 is disposed below vehicle body floor 3 located on a rear side of motor room 2. Dash panel 4 upright extends between motor room 2 and vehicle body floor 3. Vehicle body floor 3 constitutes a floor of vehicle compartment 5 separated from motor room 2 by dash panel 4. Further, charging port 40 is disposed above front bumper 6 in a front portion of motor room 2, and located in a substantially central position in a width direction of the vehicle.

Motor drive unit 10 is a running drive source of electric vehicle 1, and is supported on a pair of side members 2a, 2a (see FIG. 2) extending in a lower portion of motor room 2, through a supporter (not shown). Motor drive unit 10 includes motor 11 for driving the vehicle, speed reducer 12 that reduces rotation of motor 11 and transmits the reduced rotation thereof to differential gear 12a, and motor housing 13 that accommodates motor 11 and speed reducer 12. Motor 11 of motor drive unit 10 is used not only as the drive source for running of the vehicle but also as a generator.

High-power unit 20 serves to supply drive current to motor drive unit 10 as the running drive source, and is mounted on an upper side of motor drive unit 10. High-power unit 20 includes inverter 21 and high-power module 22.

Inverter 21 is connected to motor drive unit 10 through a three-phase alternating current harness (not shown), and serves to alternately carry out conversion from direct current to three-phase alternating current and vice versa. In this embodiment, inverter 21 converts direct current from high-power module 22 to three-phase alternating current, and supplies the three-phase alternating current to motor 11 during power running of motor 11, and inverter 21 converts three-phase alternating current from motor 11 to direct current and supplies the direct current to high-power module 22 during regeneration of motor 11. Inverter 21 is accommodated in inverter housing 21a, which is mounted directly above motor drive unit 10.

High-power module 22 is a voltage control device that controls voltage of electric power to be supplied to motor drive unit 10 and voltage of electric power to be charged to battery pack 30. High-power module 22 includes DC/DC converter and a charger. High-power module 22 is accommodated in high-power module housing 23, which is mounted directly above inverter 21.

High-power module 22 is connected to battery pack 30 through charging/discharging harness 51, connected to charging port 40 through charging harness 52, and connected to inverter 21 through a high-power harness (high voltage harness), not shown.

The above-described DC/DC converter converts rapid charging voltage from an external rapid charge power source (not shown) to charging voltage and provides the charging voltage to battery pack 30. In addition, the DC/DC converter converts charging voltage from battery pack 30 to driving voltage and supplies the driving voltage to inverter 21 during power running of motor 11, and converts power generating voltage from inverter 21 to charging voltage and provides the charging voltage to battery pack 30 during regeneration of motor 11.

Further, the above-described charger converts ordinary charging voltage from an external ordinary charging power source (not shown) to charging voltage and provides the charging voltage to battery pack 30.

Battery pack 30 includes multiple battery modules constituted of secondary batteries, a control circuit that controls charging, discharging, etc. of the battery modules, a cooling device and other parts, and battery housing 31 that accommodates these components. Examples of the secondary battery are a lithium ion battery, a rechargeable nickel-cadmium battery, nickel-metal hydride battery, etc.

Charging port 40 is an electrical energy receiving portion to which external electric power to be charged to battery pack 30 is inputted by being contacted and connected with an external power source (not shown). Charging port 40 includes rapid charging port 41 and ordinary charging port 42.

Connected to rapid charging port 41 is a rapid charger as a high voltage direct current power source. Rapid charging port 41 is connected to high-power module 22 through rapid charging harness 53 of charging harness 52 in which high voltage-current flows.

Connected to ordinary charging port 42 is a low voltage alternating current power source that provides about 100 to 200 volts for domestic use. Ordinary charging port 42 is connected to high-power module 22 through ordinary charging harness 54 of charging harness 52 in which a current with a voltage lower than the voltage of the high voltage current flowing in rapid charging harness 53 flows.

[Constitution of Unit Back Surface of High-Power Unit]

Figure 4:
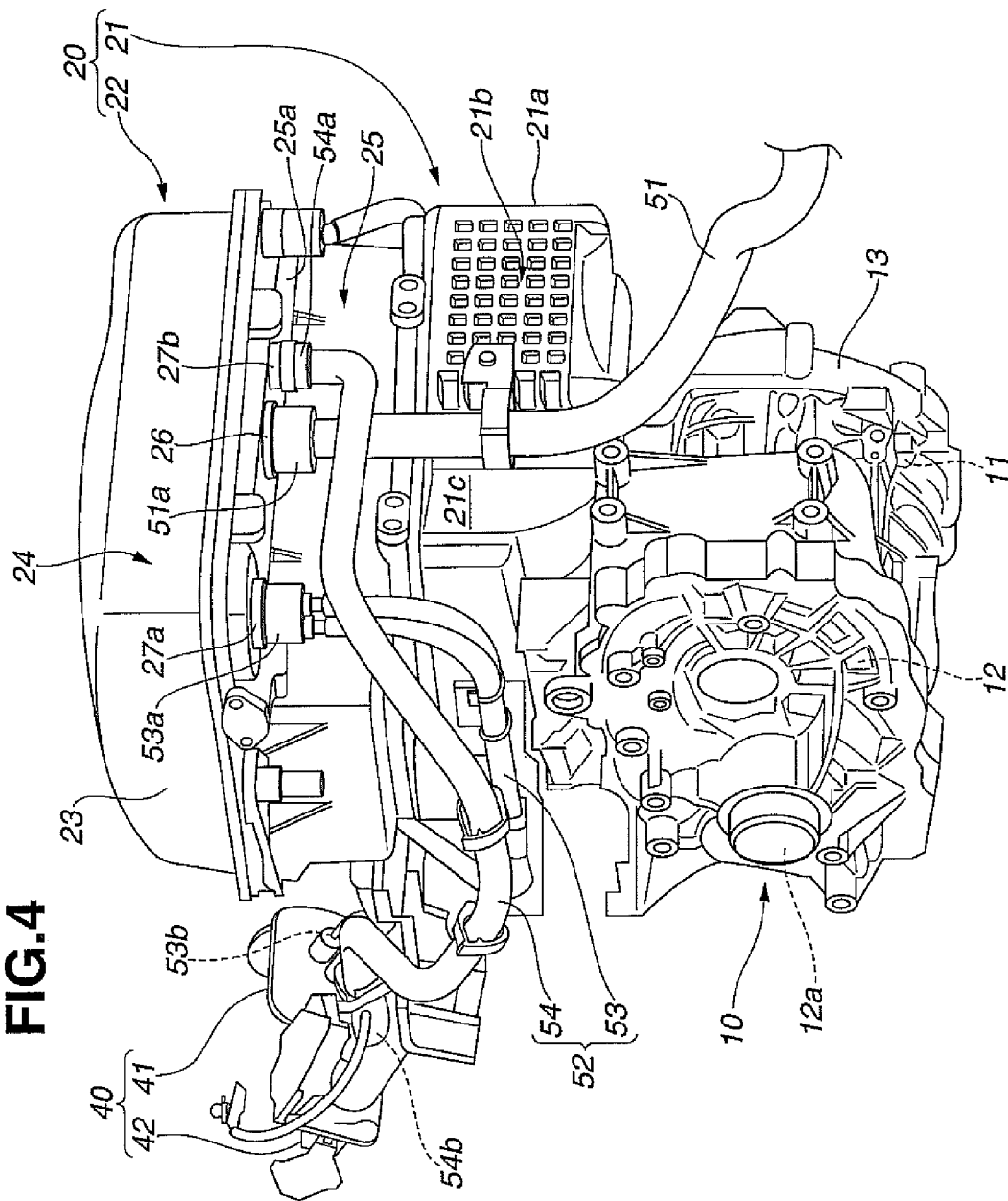
FIG. 4 is a perspective view of a high-power unit according to the embodiment of the present invention as viewed from a back side of the high-power unit.
Figure 5:
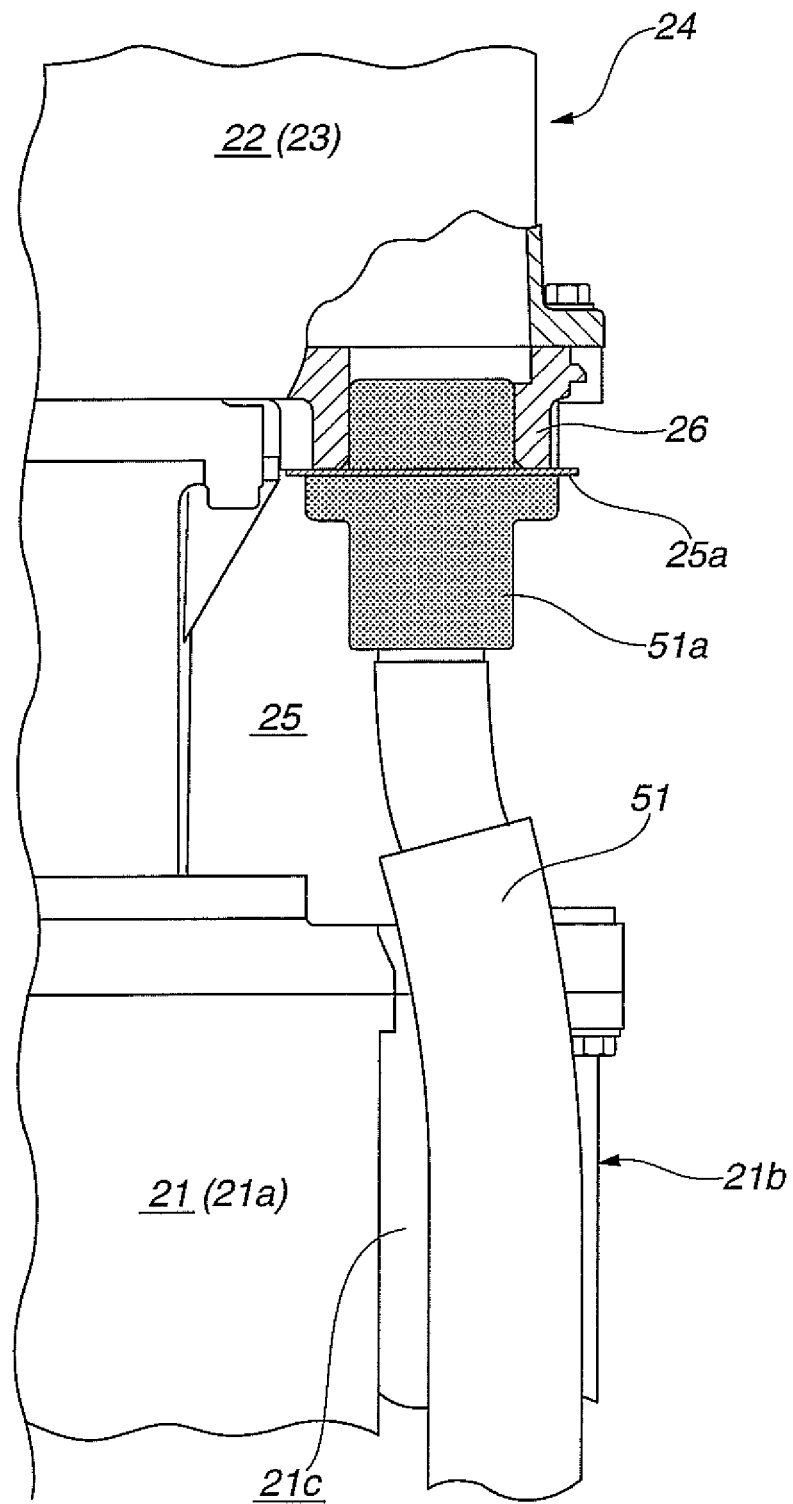
FIG. 5 is an enlarged sectional view of an essential part of a charging/discharging harness connection terminal of the high-power unit according to the embodiment of the present invention.

FIG. 4 is a perspective view of the high-power unit according to the embodiment as viewed from a back side of the high-power unit. FIG. 5 is an enlarged sectional view of an essential part of a charging/discharging harness connection terminal of the high-power unit according to the embodiment of the present invention.

Figure 6:
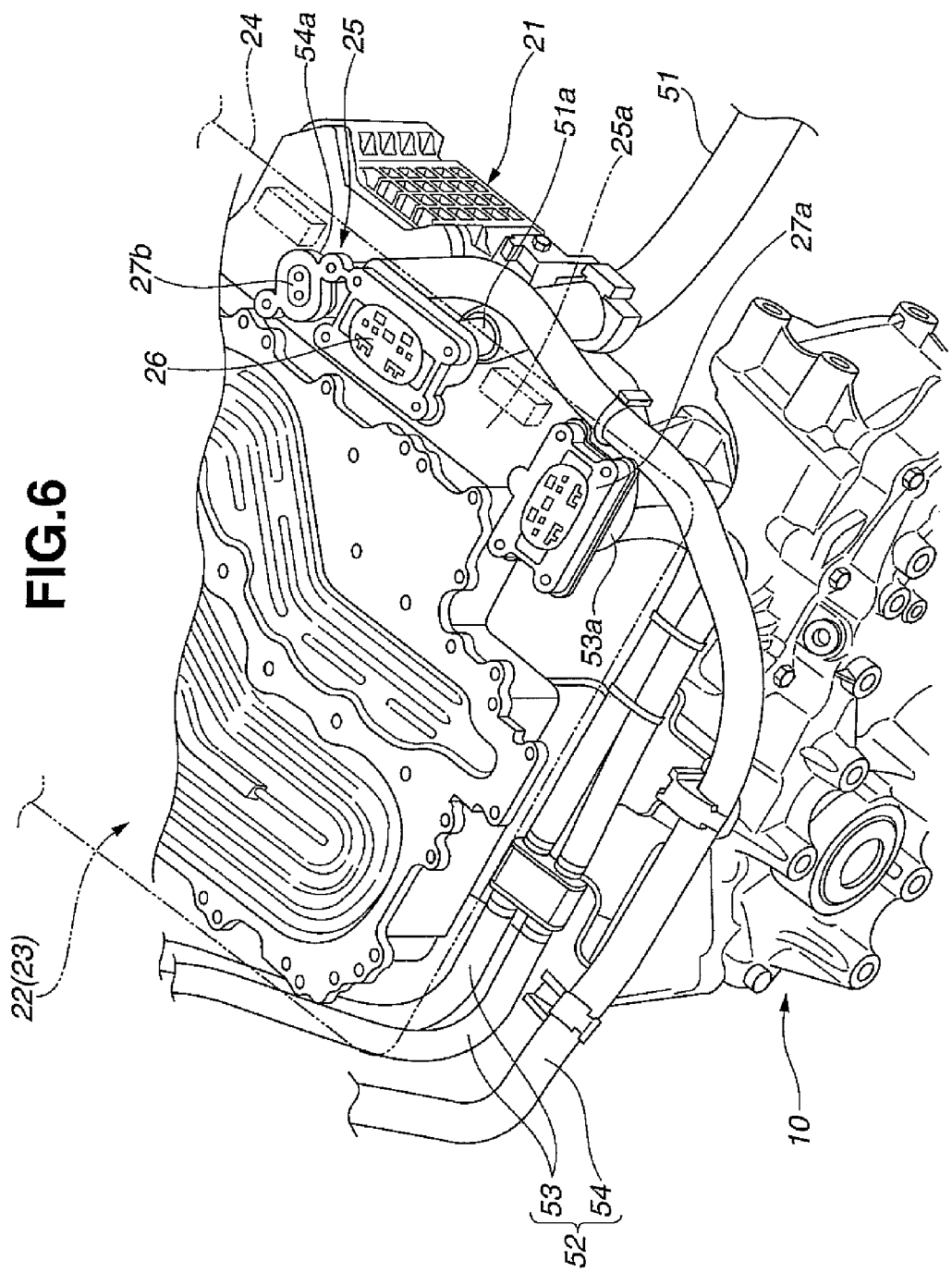
FIG. 6 is a sectional perspective view showing a cross-section of the high-power unit according to the embodiment of the present invention.

FIG. 6 is a sectional perspective view showing a cross-section of the high-power unit according to the embodiment.

In this embodiment, high-power module housing 23 is a rectangular-box shaped casing, and has high-power module back surface (unit back surface) 24 that faces dash panel 4. Harness connection concave portion 25 is formed on a lower side of high-power module back surface 24. Harness connection concave portion 25 is stepwise recessed from high-power module back surface 24 toward an inside of high-power module 22 (that is, toward a vehicle-forward side). That is, harness connection concave portion 25 is recessed from high-power module back surface 24 toward the vehicle-forward side in such a manner that harness connection concave portion 25 becomes away from dash panel 4.

Harness connection concave portion 25 includes eaves inner surface (i.e., ceiling surface) 25a that faces downward of the vehicle, and is opened toward a vehicle-rearward side and both vehicle-lateral sides (both left and right sides of the vehicle). However, harness connection concave portion 25 may be closed at both left and right ends thereof. Charging/discharging harness connection terminal 26, rapid charging harness connection terminal 27a and ordinary charging harness connection terminal 27b are disposed on eaves inner surface 25a so as to face downwardly.

Charging/discharging harness connection terminal 26 is a terminal to which one end 51a of charging/discharging harness 51 located on a side of high-power module 22 is connected from a vehicle-downward side. Charging/discharging harness connection terminal 26 is connected to the DC/DC converter and the charger within high-power module housing 23. Charging/discharging harness connection terminal 26 is located in a substantially middle of eaves inner surface 25a in the width direction of the vehicle.

Rapid charging harness connection terminal 27a is a terminal to which one end 53a of rapid charging harness 53 located on the side of high-power module 22 is connected from the vehicle-downward side. Rapid charging harness connection terminal 27a is connected to the DC/DC converter within high-power module housing 23. Rapid charging harness connection terminal 27a is located in the vicinity of one of lateral sides (left and right sides) of eaves inner surface 25a.

Ordinary charging harness connection terminal 27b is a terminal to which one end 54a of ordinary charging harness 54 located on the side of high-power module 22 is connected from the vehicle-downward side. Ordinary charging harness connection terminal 27b is connected to the charger within high-power module housing 23. Ordinary charging harness connection terminal 27b is located slightly offset from the substantially middle of eaves inner surface 25a toward a lateral side in the width direction of the vehicle adjacent to charging/discharging harness connection terminal 26.

Figure 7:
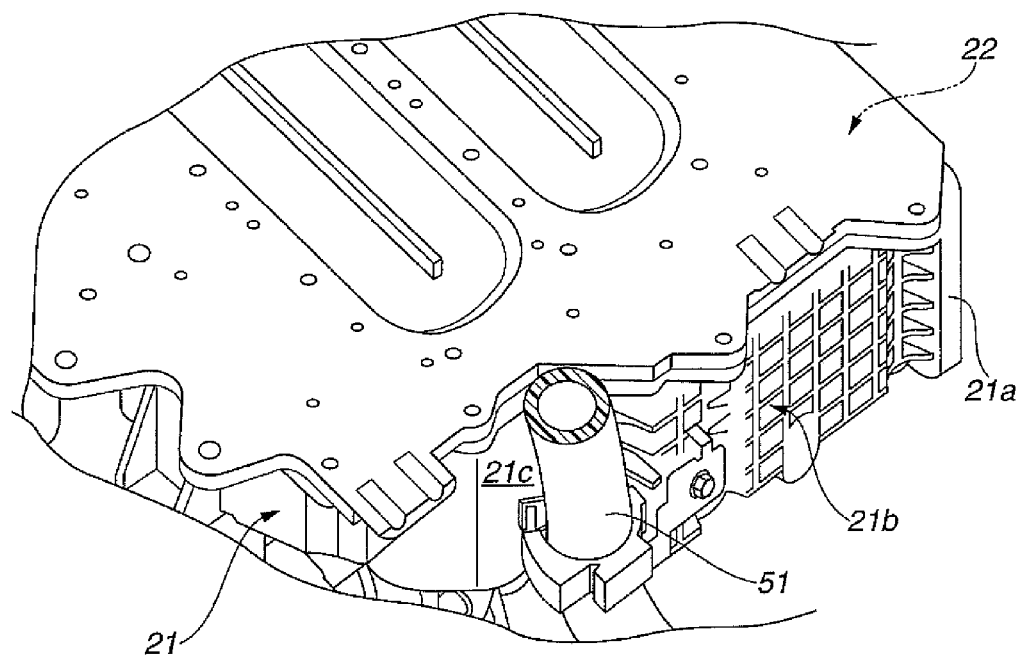
FIG. 7 is a sectional perspective view of an essential part of the high-power unit according to the embodiment of the present invention, showing a harness retreat concave portion of the high-power unit.

FIG. 7 is a sectional perspective view of an essential part of the high-power unit according to the embodiment of the present invention, showing a harness retreat concave portion of the high-power unit.

In this embodiment, inverter housing 21a is a rectangular-box shaped casing, and has inverter back surface (unit back surface) 21b that faces dash panel 4. Harness connection concave portion 25 is provided in the form of a groove disposed between high-power module back surface 24 of high-power module housing 23 and inverter back surface 21b of inverter housing 21a. Harness retreat concave portion 21c is formed in a part of inverter back surface 21b in order to accommodate charging/discharging harness 51. Harness retreat concave portion 21c is recessed from inverter back surface 21b toward an inside of inverter 21. Harness retreat concave portion 21c is disposed in a region located downward of harness connection concave portion 25, and continuously extends from harness connection concave portion 25. Harness retreat concave portion 21c is opened rearward of the vehicle.

[Harness Routing Structure]

As shown in FIG. 4, charging/discharging harness 51 is connected at one end 51a thereof to charging/discharging harness connection terminal 26 from the vehicle-downward side, and is downward routed from high-power module back surface 24 along inverter back surface 21b. At this time, charging/discharging harness 51 is accommodated inside of harness retreat concave portion 21c. As shown in FIG. 1, charging/discharging harness 51 is then routed rearward of the vehicle to pass through below dash panel 4 so that the other end 51b thereof is connected to battery terminal 30a located in the middle of a front end portion of battery pack 30.

Charging/discharging harness connection terminal 26 is located in the substantially middle of eaves inner surface 25a in the width direction of the vehicle, and battery terminal 30a is located in the middle of the front end portion of battery pack 30. Therefore, charging/discharging harness 51 is substantially linearly routed along the forward and rearward direction of the vehicle.

Rapid charging harness 53 is connected at one end 53a thereof to rapid charging harness connection terminal 27a from the vehicle-downward side, and then is routed forward of the vehicle along a lateral side surface of inverter housing 21a so that the other end 53b thereof is connected to rapid charging port 41.

Rapid charging harness 53 allows direct connection between rapid charging port 41 and rapid charging harness connection terminal 27a.

Ordinary charging harness 54 is connected at one end 54a thereof to ordinary charging harness connection terminal 27b from the vehicle-downward side, and is routed to extend around behind the vehicle-rearward side of charging/discharging harness 51. After that, ordinary charging harness 54 is routed forward of the vehicle along the lateral side surface of inverter housing 21a. Ordinary charging harness 54 is then routed forward of the vehicle so that the other end 54b thereof is connected to ordinary charging port 42.

Ordinary charging harness 54 allows direct connection between ordinary charging port 42 and ordinary charging harness connection terminal 27b. In addition, upon being routed along the lateral side surface of inverter housing 21a, ordinary charging harness 54 is located on an outside of rapid charging harness 53. That is, rapid charging harness 53 is routed closer to inverter housing 21a than ordinary charging harness 54.

Further, by routing ordinary charging harness 54 so as to extend around behind the vehicle-rearward side of charging/discharging harness 51, after one end 54a is connected to ordinary charging harness connection terminal 27b, ordinary charging harness 54 passes through between charging/discharging harness 51 and dash panel 4, and then is routed toward ordinary charging port 42.

Function of the charging/discharging harness routing structure in an electric vehicle according to the embodiment of the present invention is explained hereinafter with respect to "function of protecting charging/discharging harness upon vehicle front collision" and "function of protecting charging/discharging harness upon vehicle offset collision".

[Function of Protecting Charging/Discharging Harness Upon Vehicle Front Collision]

The high-power unit and the battery pack which are disposed on the front side of the vehicle and the rear side of the vehicle, respectively, such that the dash panel is disposed therebetween, are connected with each other through the charging/discharging harness extending in the forward and rearward direction of the vehicle. Therefore, in order to ensure protection of the charging/discharging harness, it is necessary that the high-power unit is initially contacted with the dash panel upon front collision of the vehicle. In the following, the function of protecting the charging/discharging harness upon the vehicle front collision is explained by referring to FIGS. 8(a)-8(c).

When a front surface of motor room 2 is deformed toward the rear side of the vehicle due to front collision of the vehicle, radiator 7 and fan device 8 (see FIG. 3) which are disposed on the front side of the vehicle within motor room 2 are rearward moved. Then, when motor room 2 is further rearward deformed, motor drive unit 10 and high-power unit 20 are displaced rearward of the vehicle. In accordance with the displacement of high-power unit 20, charging/discharging harness connection terminal 26 to which one end 51a of charging/discharging harness 51 is connected is moved close to dash panel 4.

Charging/discharging harness connection terminal 26 is arranged inside of harness connection concave portion 25 formed in high-power module back surface 24 as the unit back surface of high-power unit 20 which faces dash panel 4.

Figure 8A:
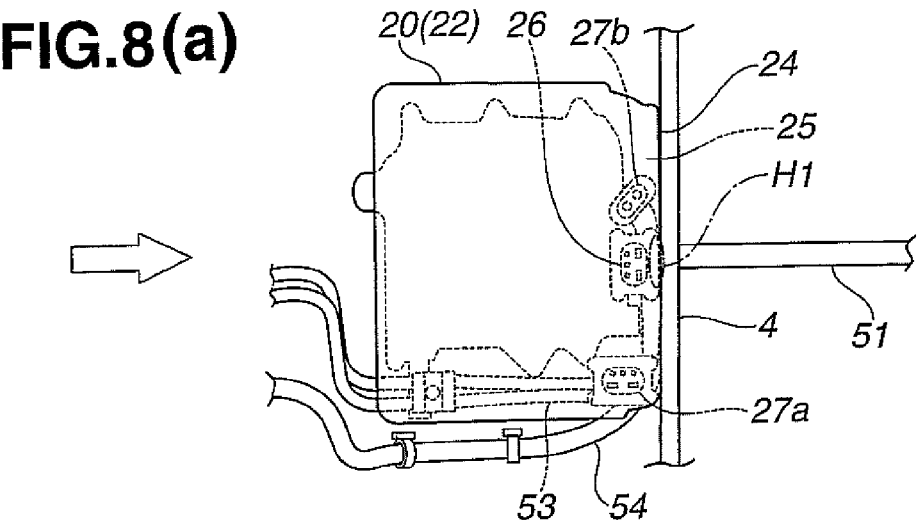

With the arrangement, when high-power unit 20 is caused to interfere with dash panel 4, as shown in FIG. 8(a), high-power module back surface 24 of high-power module housing 23 is initially brought into contact with dash panel 4. On the other hand, owing to the contact of high-power module back surface 24 with dash panel 4, space H1 is retained between dash panel 4 and charging/discharging harness connection terminal 26 located inside of harness connection concave portion 25. Therefore, charging/discharging harness connection terminal 26 can be prevented from being contacted with dash panel 4. As a result, it is possible to prevent charging/discharging harness connection terminal 26 from interfering with dash panel 4 and thereby enhance protection of charging/discharging harness 51.

Figure 8B:
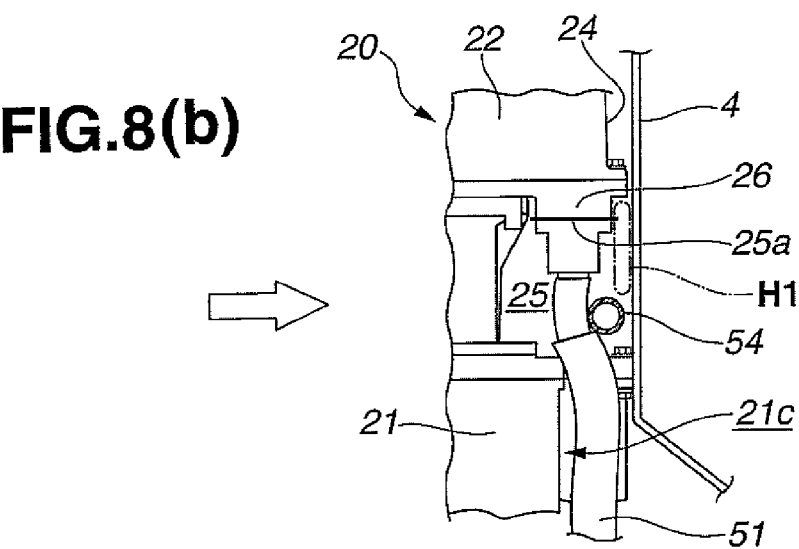

Further, in the charging/discharging harness routing structure according to the embodiment, charging/discharging harness connection terminal 26 is disposed on eaves inner surface 25a so as to face downward. With the routing structure, as shown in FIG. 4, charging/discharging harness 51 connected to charging/discharging harness connection terminal 26 is downwardly routed along high-power module back surface 24. That is, charging/discharging harness 51 extends in a direction substantially parallel with dash panel 4. As a result, as shown in FIG. 8(b), even when charging/discharging harness 51 is caused to rearward move, charging/discharging harness 51 can hardly interfere with dash panel 4 so that more effective protection of charging/discharging harness 51 can be attained.

Particularly, in the charging/discharging harness routing structure according to the embodiment, inverter 21 as high-power unit 20 is provided with harness retreat concave portion 21c in which charging/discharging harness 51 is accommodated, in the region located downward of harness connection concave portion 25.

Figure 8C:
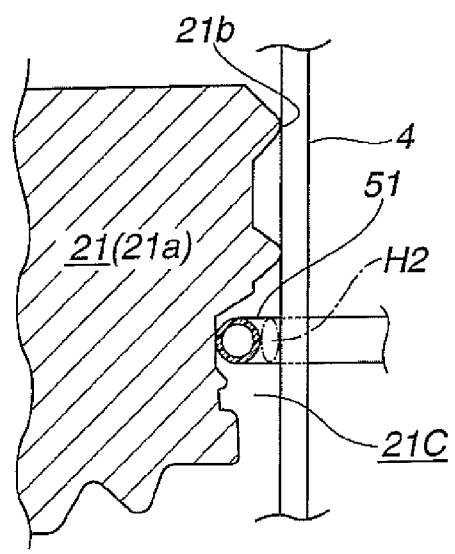

With the provision of harness retreat concave portion 21c, as shown in FIG. 8(c), even in a case where inverter 21 is caused to rearward move and interfere with dash panel 4 due to the vehicle front collision, inverter back surface 21b of inverter housing 21a is initially brought into contact with dash panel 4. Owing to the contact of inverter back surface 21b with dash panel 4, space H2 between dash panel 4 and charging/discharging harness 51 accommodated within harness retreat concave portion 21c can be retained to thereby prevent charging/discharging harness 51 from being contacted with dash panel 4. Thus, inverter back surface 21b surrounding harness retreat concave portion 21c is brought into contact with dash panel 4 earlier than charging/discharging harness 51, so that charging/discharging harness connection terminal 26 can be prevented from interfering with dash panel 4. As a result, charging/discharging harness 51 can be protected.

In addition, in the charging/discharging harness routing structure according to the embodiment, as shown in FIG. 4, the charging harness connection terminals to which one ends 53a, 54a of charging harness 52 are connected (in this embodiment, rapid charging harness connection terminal 27a and ordinary charging harness connection terminal 27b) are arranged within harness connection concave portion 25.

With the arrangement, in a case where high-power unit 20 is caused to interfere with dash panel 4 in accordance with occurrence of front collision of the vehicle, initially high-power module back surface 24 of high-power module housing 23 is brought into contact with dash panel 4 (see FIG. 8(a)). Therefore, rapid charging harness connection terminal 27a and ordinary charging harness connection terminal 27b can be prevented from contacting with dash panel 4, so that charging harness 52 can be protected.

Further, in the charging/discharging harness routing structure according to the embodiment, rapid charging harness connection terminal 27a and ordinary charging harness connection terminal 27b which are charging harness connection terminals are disposed on eaves inner surface 25a of harness connection concave portion 25 so as to face downward (see FIG. 4). With this arrangement, rapid charging harness 53 connected to rapid charging harness connection terminal 27a and ordinary charging harness 54 connected to ordinary charging harness connection terminal 27b are downward routed along high-power module back surface 24. That is, charging harness 52 extends in a direction substantially parallel with dash panel 4 similarly to charging/discharging harness 51. As a result, even when charging harness 52 is caused to rearward move, charging harness 52 can hardly interfere with dash panel 4 so that more effective protection of charging harness 52 can be attained.

Further, in the charging/discharging harness routing structure according to the embodiment, after one end 54a of ordinary charging harness 54 is connected to ordinary charging harness connection terminal 27b disposed adjacent to charging/discharging harness connection terminal 26, ordinary charging harness 54 is routed to extend around behind the vehicle-rearward side of charging/discharging harness 51. That is, ordinary charging harness 54 is routed between charging/discharging harness 51 and dash panel 4.

With this routing of ordinary charging harness 54, even in a case where for instance, a rear portion of high-power unit 20 is upward inclined due to deformation condition of motor room 2, ordinary charging harness 54 can be located on the vehicle-rearward side of charging/discharging harness 51, that is, on a side of dash panel 4 (see FIG. 8(b)). As a result, ordinary charging harness 54 can serve to reduce impact that is added from dash panel 4 to charging/discharging harness 51, so that charging/discharging harness 51 can be more effectively protected.

[Function of Protecting Charging/Discharging Harness Upon Vehicle Offset Collision]

In order to ensure performance of protection of the charging/discharging harness connecting the high-power unit and the battery pack with each other which are arranged on the vehicle-front side and the vehicle-rear side, respectively, such that the dash panel is disposed therebetween, the high-power unit must be initially brought into contact with the dash panel even when vehicle offset collision occurs. In the following, function of protecting the charging/discharging harness upon vehicle offset collision is explained by referring to FIG. 9.

When a front-left side of motor room 2 is deformed rearward of the vehicle due to occurrence of offset collision of the vehicle (in this embodiment, input of load to the front-left side), a side portion of each of radiator 7 and fan device 8 disposed on the vehicle-front side within motor room 2 is rearward moved.

When motor room 2 is further deformed rearward of the vehicle, a side portion of each of motor drive unit 10 and high-power unit 20 is displaced diagonally rearward of the vehicle. In accordance with the displacement, charging/discharging harness connection terminal 26 and charging/discharging harness 51 that is connected at one end 51a to charging/discharging harness connection terminal 26 and downward routed along high-power module back surface 24 are moved close to dash panel 4.

Since charging/discharging harness connection terminal 26 is disposed inside of harness connection concave portion 25, even in a case where high-power unit 20 is diagonally rearward moved to interfere with dash panel 4 due to the offset collision, initially high-power module back surface 24 of high-power module housing 23 is brought into contact with dash panel 4 (at portion A in FIG. 9(a)). Therefore, charging/discharging harness connection terminal 26 disposed inside of harness connection concave portion 25 can be prevented from contacting with dash panel 4, so that charging/discharging harness 51 can be protected.

Further, inverter 21 constituting high-power unit 20 is provided with harness retreat concave portion 21c in which charging/discharging harness 51 is accommodated, in the region located downward of harness connection concave portion 25.

With the provision of harness retreat concave portion 21c, even in a case where high-power unit 20 is diagonally rearward moved to interfere with dash panel 4 due to the offset collision, inverter back surface 21b of inverter housing 21a is initially brought into contact with dash panel 4 (at portion B in FIG. 9(b)). Due to the contact of inverter back surface 21b with dash panel 4, dash panel 4 is caused to rearward move so that charging/discharging harness connection terminal 26 accommodated in harness retreat concave portion 21c can be prevented from contacting with dash panel 4. Thus, inverter back surface 21b surrounding harness retreat concave portion 21c is brought into interfere with dash panel 4 earlier than charging/discharging harness 51. Therefore, charging/discharging harness connection terminal 26 can be prevented from interfering with dash panel 4, so that charging/discharging harness 51 can be protected.

Furthermore, in the charging/discharging harness routing structure according to the embodiment, rapid charging harness 53 and ordinary charging harness 54 which constitute charging harness 52 are routed along the lateral side surface of inverter housing 21a. At this time, rapid charging harness 53 is routed on an inside of ordinary charging harness 54, that is, on a side of inverter housing 21a.

With this routing, even in a case where the side portion of motor room 2 is deformed to contact with charging harness 52 routed along the lateral side surface of inverter housing 21a due to occurrence of vehicle offset collision, ordinary charging harness 54 in which electric current with relatively low voltage flows is brought into contact with the side portion of motor room 2 earlier than rapid charging harness 53 in which electric current with relatively high voltage flows. That is, it is possible to serve for reducing impact on rapid charging harness 53 by ordinary charging harness 54. As a result, rapid charging harness 53 can be preferentially protected prior to the ordinary charging harness in which electric current with relatively low voltage flows.

In addition, even in a case where load is inputted to a front-right side of electric vehicle 1 upon occurrence of offset collision, as shown in FIG. 9(c), initially high-power module back surface 24 of high-power module housing 23 is brought into contact with dash panel 4 (at portion C in FIG. 9(c)). Therefore, charging/discharging harness connection terminal 26 disposed inside of harness connection concave portion 25 can be prevented from contacting with dash panel 4, so that charging/discharging harness 51 can be protected.

The charging/discharging harness routing structure according to the embodiment can perform the following effects.

(1) In electric vehicle 1, high-power unit (inverter 21, high-power module 22) 20 disposed in motor room 2 to supply drive current to motor drive unit 10 as a running drive source, and battery pack 30 disposed below vehicle body floor 3 are connected to each other through charging/discharging harness 51, high-power unit (high-power module) 22 including unit back surface (high-power module back surface) 24 that faces dash panel 4 upright extending between motor room 2 and vehicle body floor 3, and harness connection concave portion 25 recessed from unit back surface 24 toward an inside of high-power unit 22, wherein charging/discharging harness connection terminal 26 to which one end 51a of charging/discharging harness 51 is connected is disposed inside of harness connection concave portion 25. With this arrangement, when an external force is inputted to electric vehicle 1, charging/discharging harness connection terminal 26 can be prevented from interfering with dash panel 4 so that charging/discharging harness 51 can be protected.

(2) Harness connection concave portion 25 includes eaves inner surface 25a that faces downward of the vehicle, and charging/discharging harness connection terminal 26 is disposed on eaves inner surface 25a so as to face downwardly. With this arrangement, charging/discharging harness 51 downward extends along unit back surface 24 so that charging/discharging harness 51 and dash panel 4 are located parallel with each other. Therefore, charging/discharging harness 51 and dash panel 4 hardly interfere with each other, so that charging/discharging harness 51 can be more effectively protected.

(3) High-power unit (inverter) 21 includes harness retreat concave portion 21c in a region located downward of harness connection concave portion 25, harness retreat concave portion 21c being recessed from unit back surface (inverter back surface) 21b toward an inside of high-power unit (inverter) 21. Charging/discharging harness 51 is accommodated in harness retreat concave portion 21c. With this arrangement, charging/discharging harness 51 can be protected regardless of a direction in which an external force that is inputted to electric vehicle 1.

(4) High-power unit (high-power module) 22 and electrical energy receiving portion (charging port) 40 to which external electric power to be charged to battery pack 30 is inputted are connected to each other through charging harness 52. Harness connection concave portion 25 accommodates charging harness connection terminals (rapid charging harness connection terminal 27a and ordinary charging harness connection terminal 27b) to which one ends 53a, 54a of charging harness 52 are connected. With this arrangement, when an external force is inputted to electric vehicle 1, charging harness 52 can be protected.

(5) Harness connection concave portion 25 includes eaves inner surface 25a that faces downward of the vehicle, and charging harness connection terminals 27a, 27b are disposed on eaves inner surface 25a so as to face downwardly. With this arrangement, charging harness 52 can be downward routed along unit back surface 24. Accordingly, charging harness 52 and dash panel 4 are located parallel with each other, thereby hardly interfering with each other. As a result, charging/discharging harness 51 can be more effectively protected.

(6) Charging harness 52 includes rapid charging harness 53 in which high-voltage current flows and ordinary charging harness 54 in which current with voltage lower than that of rapid charging harness 53 flows. Ordinary charging harness 54 is routed to extend between charging/discharging harness 51 and dash panel 4 toward electrical energy receiving portion (ordinary charging port) 42. With this structure, it is possible to reduce impact that is added from dash panel 4 to charging/discharging harness 51 by ordinary charging harness 54.

Although the invention has been described above by reference to the above embodiment of the invention, the invention is not limited to the embodiment. Further modifications and variations of the embodiment described above will occur to those skilled in the art unless being diverted from the subject matter of the invention according to the following claims.

In the embodiment, inverter 21 and high-power module 22 of high-power unit 20 are respectively accommodated in individual housings, and high-power module 22 is disposed on an upper side of inverter 21. However, the arrangement of inverter 21 and high-power module 22 is not limited to the embodiment. For instance, inverter 21 and high-power module 22 may be accommodated within the same housing to thereby form a one-piece unit, or inverter 21 may be disposed on an upper side of high-power module 22. Further, the DC/DC converter and the charger within high-power module may be separated from each other. In any case, high-power unit 20 is constituted of a group of devices which includes the inverter, the DC/DC converter and the charger and supplies drive current to motor drive unit 10 as a running drive source.

Further, in the embodiment, charge of battery pack 30 is carried out by connecting an external power source (not shown) to charging port 40 as an electrical energy receiving portion. However, charge of battery pack 30 is not limited to the embodiment, and may be carried out using an electromagnetic induction type non-contact power supply device that includes a coil as the electrical energy receiving portion and serves to transmit electric power from a power supply side to an electrical energy receiving side without contact therebetween by magnetically connecting the coil to a primary coil on the power supply side.

Further, in the embodiment, charging port 40 is arranged on the front portion of motor room 2. However, the arrangement is not limited to the embodiment, and charging port 40 may be arranged to face a lateral side surface of the vehicle. Furthermore, motor room 2 is divisionally formed not on the front portion of the vehicle but on a rear portion of the vehicle.

In addition, in the embodiment, rapid charging harness 53 and ordinary charging harness 54 are directly connected to charging port 40 as shown in FIG. 2 and FIG. 3. However, in order to enhance maintenance performance of respective charging harnesses 53, 54, there can be provided an intermediate connector that is detachably connected with a front-side portion of the respective charging harnesses which is connected to charging port 40, and a rear-side portion thereof.

The invention claimed is:

1. A charging/discharging harness routing structure in an electric vehicle, comprising:
   a high-power unit disposed in a motor room to supply drive current to a motor drive unit as a running drive source;
   a battery pack disposed below a vehicle body floor;
   a charging/discharging harness through which the high-power unit and the battery pack are connected to each other,
   the high-power unit comprising:
   an upper unit hack surface and a lower unit back surface which face a dash panel upright extending between the motor room and the vehicle body floor; and
   a harness connection concave portion disposed between the upper unit back surface and the lower unit back surface and recessed from the upper unit back surface and the lower unit back surface toward an inside of the high-power unit in the form of a groove,
   wherein a charging/discharging harness connection terminal to which one end of the charging/discharging harness is connected is disposed inside of the harness connection concave portion.

2. The charging/discharging harness routing structure in an electric vehicle as claimed in claim 1, wherein the harness connection concave portion comprises a ceiling surface that faces downward of the electric vehicle, the charging/discharging harness connection terminal being disposed on the ceiling surface so as to face downwardly.

3. The charging/discharging harness routing structure in an electric vehicle as claimed in claim 1, wherein the high-power unit comprises a harness retreat concave portion in a region located downward of the harness connection concave portion, the harness retreat concave portion being continuously connected to the harness connection concave portion and recessed from the lower unit hack surface toward an inside of the high-power unit, the charging/discharging harness being accommodated in the harness retreat concave portion.

4. The charging/discharging harness routing structure in an electric vehicle as claimed in claim 2, wherein the high-power unit comprises a harness retreat concave portion in a region located downward of the harness connection concave portion, the harness retreat concave portion being continuously connected to the harness connection concave portion and recessed from the lower unit hack surface toward an inside of the high-power unit, the charging/discharging harness being accommodated in the harness retreat concave portion.

5. The charging/discharging harness routing structure in an electric vehicle as claimed in claim 1, wherein the high-power unit and an electrical energy receiving portion to which external electric power to be charged to the battery pack is inputted are connected to each other through a charging harness, and a charging harness connection terminal connected with one end of the charging harness is disposed within the harness connection concave portion.

6. The charging/discharging harness routing structure in an electric vehicle as claimed in claim 5, wherein the harness connection concave portion comprises a ceiling surface that faces downward of the electric vehicle, the charging harness connection terminal being disposed on the ceiling surface so as to face downwardly.

7. The charging/discharging harness routing structure in an electric vehicle as claimed in claim 6, wherein the charging harness comprises a rapid charging harness in which a current with a high voltage flows and an ordinary charging harness in which a current with a voltage lower than the high voltage of the current flowing in the rapid charging harness flows, the ordinary charging harness being routed to extend between the charging/discharging harness and the dash panel toward the electrical energy receiving portion.

8. A charging/discharging harness routing structure in an electric vehicle, comprising:
   a high-power unit disposed in a motor room to supply drive current to a motor drive unit as a running drive source;
   a battery pack disposed below a vehicle body floor;
   a charging/discharging harness through which the high-power unit and the battery pack are connected to each other,
   the high-power unit comprising:
   an upper unit back surface and a lower unit back surface which face a dash panel upright extending between the motor room and the vehicle body floor; and
   a means for accommodating a charging/discharging harness connection terminal to which one end of the charging/discharging harness is connected, the means being disposed between the upper unit back surface and the lower unit back surface.

* * * * *